United States Patent [19]

Randin

[11] 4,231,641
[45] Nov. 4, 1980

[54] ELECTRO-OPTIC DEVICE

[75] Inventor: Jean-Paul Randin, Cortaillod, Switzerland

[73] Assignee: Ebauches S.A., Neuchatel, Switzerland

[21] Appl. No.: 946,147

[22] Filed: Sep. 27, 1978

Related U.S. Application Data

[63] Continuation-in-part of Ser. No. 744,943, Nov. 24, 1976, abandoned.

[30] Foreign Application Priority Data

Nov. 29, 1975 [CH] Switzerland ............... 15447/75

[51] Int. Cl.³ .................. G02F 1/01; G02F 1/23
[52] U.S. Cl. ..................... 350/357; 204/242; 350/350 R
[58] Field of Search ............. 204/242; 350/350, 357

[56] References Cited

U.S. PATENT DOCUMENTS

| | | | |
|---|---|---|---|
| 3,245,935 | 4/1966 | Hargreaves et al. | 260/79.3 R X |
| 3,336,271 | 8/1967 | Durocher | 260/79.3 R |
| 3,396,136 | 8/1968 | Dickerson | 260/79.3 R X |
| 3,684,747 | 8/1972 | Coalson et al. | 260/79.3 R X |
| 3,708,220 | 1/1973 | Meyers et al. | 350/160 R |
| 3,774,988 | 11/1973 | Rogers | 350/357 X |
| 3,879,108 | 4/1975 | Berets | 350/357 |
| 3,912,368 | 10/1975 | Ponjee et al. | 350/160 R |
| 4,088,395 | 5/1978 | Giglia | 350/357 |
| 4,116,546 | 9/1978 | Leibowitz | 350/357 |

FOREIGN PATENT DOCUMENTS 1407133  9/1975  United Kingdom ............ 350/357

*Primary Examiner*—F. C. Edmundson
*Attorney, Agent, or Firm*—Silverman, Cass & Singer, Ltd.

[57] ABSTRACT

An electro-optic device comprising a transparent conductive layer, an electrochromic layer applied on the said transparent layer, these two first elements constituting together a first electrode, a counter-electrode maintained at distance from the said first electrode, and an electrolyte ensuring an ionic binding between the electrode and the counter-electrode. Preferably, the electrolyte is a polymer of linear molecules such as polystyrene sulfonic acid including a pigment.

A combination cell of a perfluorosulfonic acid polymer membrane and polystyrene sulfonic acid is disclosed.

30 Claims, 2 Drawing Figures

ELECTRO-OPTIC DEVICE

CROSS-REFERENCE TO OTHER APPLICATIONS

This application is a Continuation-In-Part of my pending application Ser. No. 744,943 filed Nov. 24, 1976 now abandoned entitled ELECTRO-OPTIC DEVICE.

BACKGROUND OF THE INVENTION

The present invention relates to an electro-optic device comprising a transparent conductive layer, an electrochromic layer applied on the said transparent layer, these two first elements constituting together a first electrode, a counter-electrode maintained at distance from the said first electrode, and an electrolyte ensuring an ionic binding between the electrode and the counter-electrode.

It is understood, by "electrolyte", any conductive medium ensuring ionic connection, this connection being of cathodic and/or anionic type.

It is understood, by "electrochromic layer", a layer made of a material the characteristic of absorption of the electromagnetic radiations of which is modified, even at room temperature, under the influence of an electric field. Such material, for instance, can show a weak absorption in the visible spectrum in the absence of an electric field and then be almost transparent; however, when they are submitted to an electric field, they absorb for instance the red end of the spectrum, so that they exhibit a blue color. Similar effects can be found in other portions of the spectrum of the electromagnetic radiations, as well invisible as visible.

When an electrochromic layer is deposited on a conductive transparent substrate, one can vary the optical density of this layer while applying an electric field between the electrodes thus constituted and an auxiliary electrode, or counter-electrode, the space comprised between the two electrodes being filled with an electrolyte, the whole constituting a kind of "sandwich". The application of a difference of potential to the terminals of the two electrodes permits to bring the electrochromic layer from the "clear" state or uncolored state to the dark or colored state.

One knows already such devices. Especially, it is known to deposit the electrochromic layer so that it constitutes a pattern. Several of these patterns can constitute together a data. One knows, for instance, an electro-optic display device comprising seven segments, which permits to represent, by a suitable selection of these segments, all the arabic data from 0 to 9. When the segments are alternatively colored and uncolored, the data appear and disappear successively; one calls "cycle" the succession of a coloration and of an uncoloration.

In the known electrochromic devices, for instance in those which are disclosed in the U.S. Pat. Nos. 3,704,057, 3,708,220, 3,819,252, 3,827,784 and 3,879,108, the electrolyte which is used is generally constituted by a mixture of glycerin and of sulfuric acid. This electrolyte has the drawback that the electrochromic layer disappears progressively, by erosion or dissolution, after a number of cycles or after a storage time. The process of dissolution or of erosion is presently not very well known but the presence of water and of complexing agents could be the origin of this phenomenon.

The use, for the realization of the electrolyte, of aprotic solvents (which do not contain protons) in which is dissolved, for instance, lithium perchlorate, gives rise to technologic difficulties: The drying of the electrolyte so that it does not contain water, the rate of the process of coloration-uncoloration which is slower than with a protonic electrolyte since one injects a cation larger than a proton, and the sealing of the electrochromic cell, for instance. If an ionic conductive electrolyte, such as mentioned in U.S. Pat. No. 3,712,710 and which is solid at room temperature is used, the problem of the contact at the electrode-solid electrolyte interface must be solved so that the electric contact will not be lost during the operation.

The purpose of the present invention is to remove these drawbacks.

SUMMARY OF THE INVENTION

The electro-optic device according to the invention is characterized by the fact that its electrolyte is made of solid or pasty organic material constituted by at least a polymer comprising ionic groups of the type used as ion-exchange materials, the said material of the electrolyte being chemically stable and compatible with that of the electrochromic layer.

This electro-optic device can be applied to electrochromic display cells, principally, but also to glasses for windows, medical spectacles or rear-view mirrors for vehicles, for instance, this list being not exhaustive.

BRIEF DESCRIPTION OF THE DRAWINGS

The drawing shows, by way of example, one embodiment of the object of the invention constituted by an electrochromic display device, and a modification.

DESCRIPTION OF THE PREFERRED EMBODIMENTS

Figure 1:
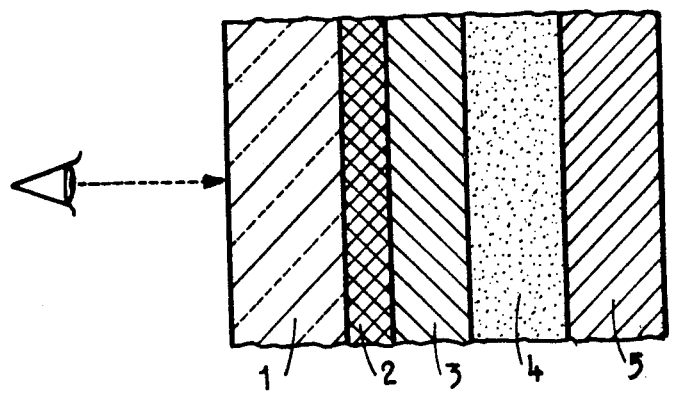
FIG. 1 is a diagrammatic sectional view of a portion of an electrochromic display device embodying the herein invention.

It should be understood that a hydrated ion-exchange resin comprises a macromolecular matrix containing fixed and dissociable ionic groups and water, constituting a gel. The free ions which balance the fixed charge of the network are supposed to be homogeneously distributed in the water contained in the resin. The cation-exchange resins have negative fixed groups and, inversely, the anion-exchange resins have fixed groups with positive charge.

The electrolyte used in the present electro-optic device, which is constituted by a solid or pasty organic material formed of at least a polymer of the type used as ion-exchange materials, has the advantage of permitting a stable, reversible and reproducible operation of the electro-optic device at low potential.

It is to be noted that the ion-exchange polymers can be classified according to the nature of the ionic groups bound to the chain of the polymer. One may distinguish four principal types, i.e., strong acids, weak acids, weak bases and strong bases.

The acid types exchange cations while the basic-types exchange anions. The principal groups of the strong acids cation-exchangers are $-SO_3H$ and $-PO_3H_2$, while the weak acids cation-exchanger is $-COOH$. An example of the strong basic type is $-CH_2-(CH_3)_3NOH$ and of the weak basic type is $>NH_2OH$. Among these four types, the sulfonic acid and quaternary ammonium hydroxide have the functions which are the most ionized and, consequently, have the highest ionic conductibility resulting from the migration of hydrogen or hydroxyl ions ($H^+$ or $OH^-$). The nature of the ionic group influences strongly the ionic conductibility of the ion-exchange polymers. The membranes which are the most conductive are those in which the mobile ion is the proton, the solvent being water at saturation (unitary activity). The functional group $—SO_3H$ should consequently be preferred to its salts, for instance: $—SO_3Na$, or to the weak acids, for instance: $—COOH$. The sulfonation ratio will also have an effect on the ionic conductibility of the ion-exchange polymer.

While the application of the ion-exchange polymers to exchanges on columns uses these materials as granules or beads, which keep empty spaces between them, the electrochromic devices need an ion-exchange material which completely fills the volume and has the shape of a continuous layer, without pores. Such coatings are known under the name of ion-exchange membranes. The latter constitute a suitable electrolyte but need the application of a pressure for ensuring a good electric contact between the electrodes and the electrolyte. The contact also can be realized while filling the membrane with an electrolyte compatible with the electro-optic layer. This technique is not however the most suitable for the electrochromic devices since, in this case, the electrolyte in contact with the electrochromic layer contributes to the dissolution or to the erosion of said layer, as mentioned hereabove.

A close contact between the electrodes and a solid ion-exchange polymer is obtained for instance while using a material soluble in a liquid having a high dielectric constant, for instance water, and while selecting the degree of solvatation for which the consistency is one of an elastomer. Another means is obviously to use a polymer which is itself an elastomer, without addition of a solvent. Another way of operating consists in the application of a thin layer of solid ionic conductive polymer between the electrochromic layer and a pasty or liquid electrolyte compatible with the said thin layer of solid ionic polymer. This thin layer will constitute a protecting layer entirely solid with ionic conductibility which will prevent or delay the process of degradation of the electrochromic layer as disclosed hereabove.

The ion-exchange membranes can be homogeneous, that is to say, can contain only the ion-exchange polymer. For some applications where, for instance, a good mechanical strength is desired, the ion-exchange membranes can be heterogeneous, that is to say contain, besides the ion-exchange polymer, a material which confers thereto some mechanical rigidity as, for instance, a thermoplastic polymer such as polyfluoroethylene (TEFLON—reg. Trademark) or polyethylene.

The ion-exchange resins used may be constituted by linear or cross-linked molecules. It is to be noted that the ion-exchange resins used currently, for instance in the water softening columns, are cross-linked with the purpose of rendering the resin insoluble in the water and of improving its mechanical and thermal properties. These characteristics are not necessary in the present application, in spite of the fact that the good operation of the electrochromic devices is not substantially affected by the cross-linking of the basic polymer (for instance: polystyrene-divinyl benzene).

The hereabove specification which relates to the electrolyte used in the present electro-optic device will not be applied to the case where an ion-exchange membrane acts as a separator between the solution contained in the anodic compartment and that contained in the cathodic compartment. Electrochromic cells using membranes as half-permeable separator of one or several liquid electrolytes could also be considered.

A summary of the properties of the ion-exchange membranes used in electrochromie and, especially, in fuel cells can be found in Chapter 6 of the book of Mitchell entitled "Fuel Cells", Academic Press, 1968, the chapter being entitled "Ion-Exchange Membrane Fuel Cells".

Another important characteristic specific to display devices as contrasted with the application to the windows, spectacles or rear-view mirrors, lies in the fact that the electrolyte constitutes often a diffusing and/or opaque medium. When the cell comprises two electrochromic symmetrical electrodes, that is to say made of the same material, the electrolyte is opaque. If the electrolyte were not opaque, one could not see the change of colour of one of the electrochromic layers, due to the fact that the other electrochromic layer would then be seen at the same time through the first transparent electrode. A diffusing medium is necessary, for instance, when the auxiliary electrode is reflecting (in the case of metals) or black (in the case of graphite). Another situation could happen when the auxiliary electrode is coplanar with the electrochromic electrode for which a better contrast is obtained if the electrolyte constitutes a medium capable of diffusing the light. For realizing such an opacity or such a diffusing medium, it is necessary to add a pigment, for instance $TiO_2$, to the ion-exchange polymer, which is compatible with the latter. The color of the pigment can be selected at choice for obtaining the desired chromatic effect. A solid or pasty electrolyte will have, as compared with a liquid electrolyte, the advantage of permitting the realization of a display of several colors in a cell having only one compartment.

The solid or pasty electrolyte used in the present electro-optic device has the advantage, with respect to the liquid electrolytes, to give rise to less assembling and tightening problems due precisely to its solid or pasty state.

In order that the ion-exchange process is satisfactorily efficient, it is necessary that the resin, which has in most of the cases the configuration of beads, be active in its whole volume. This necessitates at the same time a high volume concentration of ions which are exchangeable in the ion-exchange polymer, and a high speed of diffusion of the ions in the polymer phase. The ion-exchange electrolyte for the electro-optic devices necessitates, beside other properties, these two characteristics for its solid phase.

The ion-exchange polymer used in the present device can be considered as a solid electrolyte, ionically superconductive, in the sense where the ions exchangeable are the only ones which carry current in the electrolyte.

By way of example, the whole mechanism disclosing the electrochromic process in the case of an electrochromic layer constituted of $WO_3$ and of an auxiliary electrode also constituted of $WO_3$ but previously cathodically reduced in an acid electrolyte with a third electrode can be diagrammatically explained as follows: For an ion-exchange material of the strong acid-type:

Cathodic reaction:

$WO_3 + xR—SO_3H + xe^- \rightarrow H_xWO_3 + xR—SO_3^-$

Anodic reaction:

$H_xWO_3 + xR-SO_3^- \rightarrow WO_3 + xR-SO_3H + xe^-$

For an ion-exchange material of the weak acid type:
Cathodic reaction:
$WO_3 + xR-COOH + xe^- \rightarrow H_xWO_3 + xR-COO^-$
Anodic reaction:
$H_xWO_3 + xR-COO^- \rightarrow WO_3 + xR-COOH + xe^-$ For an ion-exchange material of the weak basis type:
Cathodic reaction:
$WO_3 + xRNH_3^+ + xH_2O + xe^- \rightarrow H_xWO_3 + xRNH_3OH$
Anodic reaction:
$H_xWO_3 + xRNH_3OH \rightarrow WO_3 + xRNH_3^+ + xH_2O + xe^-$ For an ion-exchange material of the strong basic type:
Cathodic reaction:
$WO_3 + xR_4N^+ + xH_2O + xe^- \rightarrow H_xWO_3 + xR_4NOH$
Anodic reaction:
$H_xWO_3 + xR_4NOH \rightarrow WO_3 + xR_4N^+ + xH_2O + xe^-$ In all the above mentioned reactions, the mobile ion has been supposed to be the proton $H^+$. However, as the bronzes of tungsten and of several metals, especially the alkaline metals, are known, the salts of these last metals can be used instead of the acid, if they are compatible with the electrochromic material. In the case of the $WO_3$, for instance, the sodium salt of polystyrene sulfonic acid, slightly wet, is not compatible with the electrochromic material since it dissolves $WO_3$ immediately. It will be the same with the $WO_3$ as soon as the pH of the electrolyte is alkaline. Polystyrene sulfonic acid may be referred to hereinafter by the designation PSSA.

The tungsten trioxide used in the above mentioned reactions can be replaced by any electrochromic material forming bronzes (see the U.S. Pat. Nos. 3,521,941 and 3,829,196 of AMERICAN CYANAMID COMPANY).

The electrolytes used in the present electro-optic device play a protecting role regarding the electrochromic layer, improving the duration of this layer with respect to the known electrolytes for at least one of the following indicated reasons:

1. The main property of the ion-exchange polymers is their half permeability to the ions. This means that they have the property of limiting the transport either of the cations or of the anions, preferably. A cation exchange material will have consequently only the cation which will be mobile, the macromolecular anion remaining immobile. This latter consequently will not constitute the ligand to which the dissolution of the electrochromic layer is most likely due when mobile monomolecular anions are used.

2. The macromolecule constituting the ion-exchange material represents a very viscous medium, almost solid, which is permeable only to the exchangeable ions. Hence, even if a soluble species of the electrochromic material, as for instance a tungstate or a polytungstate, formed by the action of hydroxyl ions as in the case of $WO_3$, would be formed at the electrode-pasty electrolyte interface, it could not diffuse out of the reactive layer and the destructing processes would be propagated only very slowly, if at all. In this hypothesis, the ion-exchange polymer would constitute a semi-permeable separator with two anodic and cathodic electrolytes with infinitely small thickness and volume.

The example which follows is applied to the realization of an electrochromic display cell:

One takes a transparent non-conductive support, for instance a plate of glass (layer 1 of FIG. 1 of the drawing), on which one applies a transparent conductive layer (layer 2 in the drawing), for instance $SnO_2$, realising thus the upper substrate of the cell, on which one deposits then an electrochromic layer, for instance $WO_3$ (layer 3 in the drawing), to which one will give the shape of a data, for instance, the whole constituting the electrode.

One realizes the counter-electrode, constituting the layer 5 in the drawing, by means of an electrochromic layer of $WO_3$ previously polarised cathodically at $-1.0$ V vs $Hg/Hg_2SO_4$ in an aqueous solution of sulfuric acid at 10%. This counter-electrode, strongly colored, is washed and dried before its use in the electrochromic cell.

One realizes separately the pasty electrolyte (layer 4) while using the sodium salt of polystyrene sulfonic acid (ICN Pharmaceuticals, Inc. Life Science Group—Plainview, N.Y.), with a molecular weight of about 7000. This salt is put into solution in demineralized water (about 10 g/l) and is passed through an acid ion-exchange resin such as Amberlite IR120 (reg. Trademark). One adds to the aqueous solution of polystyrene sulfonic acid thus obtained about 5 to 10 weight % (with respect to the dry polystyrene sulfonic acid) of Sun Yellow (reg. Trademark), which is a yellow pigment containing $TiO_2$-$Sb_2O_3$ used as a diffusing background to mask the auxiliary electrode. One evaporates almost all of the water in order to obtain a visco-elastic paste.

This paste of polystryrene sulfonic acid containing 5 to 10% of Sun Yellow is applied on the auxiliary electrode, or counter-electrode, constituting the layer 5 of FIG. 1 of the drawing, and the electrode constituted by the plate of glass, the transparent conductive layer of $SnO_2$ and the layer of $WO_3$ then is applied against the paste, the whole being maintained assembled.

As a modification, one proceeds as in the hereabove example, with the difference that one replaces the counter-electrode of $WO_3$ (layer 5 in the drawing) by a sheet of paper graphite prepared from an emulsion of TEFLON (reg. Trademark) and of carbon, according to the known techniques in the field of fuel cells, this counter-electrode being more easy to realize than that of $WO_3$.

The electrochromic display devices thus realized are colored by application of a constant current pulse resulting in a contrast of the data with respect to the diffusing background. The erasing is realized by applying a current pulse of identical duration to the coloration pulse, but of reverse polarity.

Figure 2:
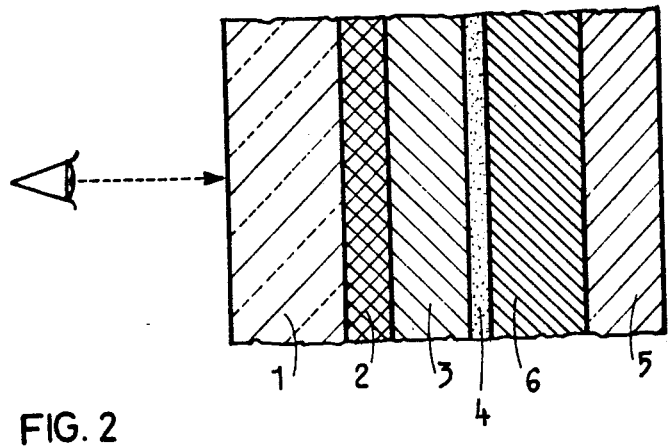
FIG. 2 is a diagrammatic sectional view of a modified embodiment of the invention.

Incidentally, it is to be noted that the layer 4 of electrolyte can have the shape of a thin film, as the film 4 of FIG. 2, playing essentially the role of a protecting layer for the electrode. The ionic binding between the electrode and the counter-electrode 5 will be obtained in series by the film 4 and by a second electrolyte, indicated in 6 in the drawing. This second electrolyte can be of any consistency, even liquid, being understood that it must be compatible with the material of the film 4 and with that of the counter-electrode 5.

The film 4 of ionic polymer could be constituted by a membrane of perfluorosulfonic acid such as disclosed in the U.S. Pat. No. 3,971,624 and German Pat. Application No. 2,639,355, and which corresponds exactly to the present cation exchange polymer. The second electrolyte (layer 6) will then be constituted by a cationic polymer, for instance polystyrene sulfonic acid (PSSA).

The electrolyte of an electrochromic cell must exhibit the four following characteristics:

1. It must be a good ionic conductor and have an electronic conduction as low as possible.
2. It must be chemically and electrochemically stable and be compatible with the materials of the electrode and of the counter-electrode.
3. It must be pigmentable for providing a diffusing and opaque background to contrast with the colored electrochromic film and to hide the counter-electrode.
4. It must ensure a uniform contact between the electrode and the counter-electrode.

Among the ionic polymers which meet the condition 1, perfluorosulfonic polymers (such as those commercialized by Du Pont de Nemours under the Trademark NAFION) are the most stable materials. However, these membranes are transparent and are not presently available in a pigmented state. Moreover, these membranes are not sufficiently soft or elastomeric for being able to ensure a uniform contact between the electrode and the counter-electrode.

The addition in series of a layer 6 of PSSA, in a pasty state, permits to produce an electrolyte (which is then constituted by the NAFION membrane and by the PSSA) exhibiting all the four abovementioned characteristics. This is due to the fact that PSSA is both pigmentable and elastomeric. By elastomeric, is meant that it ensures a good contact between the membrane of perfluorosulfonic polymer and the counter-electrode.

In addition, PSSA constitutes a buffer for water. During the assembling of the device, the NAFION membrane has a tendency to dry up more rapidly than PSSA. A dried electrolyte (NAFION+PSSA) has a resistivity which is too high to give a sufficiently rapid response time. The PSSA decreases the rate of drying of the NAFION membrane.

The advantages of the combination NAFION+PSSA are due to their complementarity:

The NAFION is chemically and electrochemically stable while the PSSA is not, and the PSSA is pigmentable and elastomeric while the commercialized NAFION is not.

It is understood that the ideal electrolyte would be a perfluorosulfonic acid membrane which would be both pigmented and able to realize a good contact with the $WO_3$. Such a good contact could be obtained, for instance, if the perfluorosulfonic acid could be coated as a thin film on the $WO_3$. This could be performed, for example, if the perfluorosulfonic acid could be available as a solution in a given solvent, the latter being removed by evaporation.

The practical realization of a cell containing the NAFION membrane and PSSA may be carried out as follows:

The electrode 1-2-3 (together with the $WO_3$), the counter-electrode 5 and the paste of PSSA are prepared as mentioned hereabove. During the assembling, a NAFION membrane 4 (No 125 of Du Pont de Nemours in Wilmington, Del., USA) is applied on the electrode constituted by the glass plate 1, the $SnO_2$ transparent conductive layer 2 and the $WO_3$ layer 3. A pretreatment of the NAFION membrane in boiling water will introduce the right amount of water in the perfluorosulfonic acid. The paste 6 of PSSA containing from 5 to 10% of pigment is applied on the NAFION membrane 4 and finally the counter-electrode 5 is placed on top of the PSSA paste, the whole being maintained properly assembled.

What I claim is:

1. Electro-optic device comprising a transparent conductive layer, an electrochromic layer applied on the said transparent layer, these two first elements constituting together a first electrode, a counter-electrode maintained at distance from the said first electrode, and an electrolyte ensuring an ionic binding between the electrode and the counter-electrode, characterized by the fact that the said electrolyte is made of solid or pasty organic material constituted by at least a polymer comprising ionic groups of the type used as ion-exchange materials, the said material of the electrolyte being chemically stable and compatible with that of the electrochromic layer.

2. Electro-optic device as claimed in claim 1, characterized by the fact that the molecular weight of the electrolyte is higher than 1000.

3. Electro-optic device as claimed in claim 1, characterized by the fact that the electrolyte is constituted by linear molecules.

4. Electro-optic device as claimed in claim 1, characterized by the fact that the electrolyte is constituted by cross-linked molecules.

5. Electro-optic device as claimed in claim 1, characterized by the fact that the electrolyte is homogeneous.

6. Electro-optic device as claimed in claim 1, characterized by the fact that the electrolyte is heterogeneous.

7. Electro-optic device as claimed in claim 1, characterized by the fact that the polymer constituting the electrolyte is in acid form.

8. Electro-optic device as claimed in claim 1, characterized by the fact that the polymer constituting the electrolyte is in salt form.

9. Electro-optic device as claimed in claim 7, characterized by the fact that the polymer is polystyrene sulfonic acid.

10. Electro-optic device as claimed in claim 7, characterized by the fact that the polymer is polyacrylic acid.

11. Electro-optic device as claimed in claim 7, characterized by the fact that the polymer is polymethacrylic acid.

12. Electro-optic device as claimed in claim 7, characterized by the fact that the polymer is phenol sulfonic acid.

13. Electro-optic device as claimed in claim 1, characterized by the fact that the polymer constituting the electrolyte in a base form.

14. Electro-optic device as claimed in claim 13, characterized by the fact that the polymer is a quaternary ammonium salt.

15. Electro-optic device as claimed in claim 1, characterized by the fact that the polymer contains a liquid having a high dielectric constant.

16. Electro-optic device as claimed in claim 1, characterized by the fact that the polymer contains a pigment.

17. Electro-optic device as claimed in claim 16, characterized by the fact that it is constituted by a cell having only one compartment filled with the electrolyte containing several pigments of different colors in different areas so as to produce a multicolored display.

18. Electro-optic device as claimed in claim 1, characterized by the fact that its electrode is constituted by an electrochromic material suitable for forming a bronze of a transition metal.

19. Electro-optic device as claimed in claim 18, characterized by the fact that its counter-electrode is constituted by the same electro-chromic material as the electrode in the reduced state.

20. Electro-optic device as claimed in claim 1, characterized by the fact that its counter-electrode is made of finely divided carbon.

21. Electro-optic device as claimed in claim 1, characterized by the fact that it comprises a film of ion-exchange polymers deposited on the electrochromic layer.

22. Electro-optic device as claimed in claim 21, characterized by the fact that the electrolyte ensures the ionic binding between the said film and the counter-electrode.

23. Electro-optic device as claimed in claim 1, characterized by the fact that it comprises a film of ion-exchange polymers deposited on the layer constituting the auxiliary electrode or counter-electrode.

24. Electro-optic device as claimed in claim 21, in which a second film of ion-exchange polymer constituted by a perfluorosulfonic acid is employed.

25. Electro-optic device as claimed in claim 21 in which the electrolyte is a cation exchange polymer in a pasty state.

26. Electro-optic device as claimed in claim 23 in which a second film of ion-exchange polymer constituted by a perfluorosulfonic acid is used.

27. Electro-optic device as claimed in claim 23 in which the electrolyte is a cation exchange polymer in a pasty state.

28. Electro-optic device comprising a transparent conductive layer, an electrochromic coating applied on the said transparent layer, these two first elements constituting together a first electrode, a counter-electrode and an electrolyte ensuring an ionic binding between the electrode and the counter-electrode, characterized by the fact that the said electrolyte is made of an elastomeric organic material constituted by at least a polymer comprising ionic groups of the type used as ion-exchange materials, the said material of the electrolyte being chemically stable and compatible with that of the electrochromic layer.

29. Electro-optic device as claimed in claim 1, characterized by the fact that its counter electrode is constituted by an electro-chromic material which is different from this of the electrode.

30. Electro-optic device comprising a transparent conductive layer, an electrochromic coating applied on the said transparent layer, these two first elements constituting together a first electrode, a counter-electrode of a material different from the first electrode and a homogenous electrolyte ensuring an ionic binding between the electrode and the counter-electrode, characterized by the fact that the said electrolyte is made of an elastomeric organic material constituted by at least a linear acidic polymer comprising ionic groups of the type used as ion-exchange materials, the said material of the electrolyte being chemically stable and compatible with that of the electrochromic layer.

* * * * *